United States Patent
Van Loon et al.

(10) Patent No.: US 7,287,820 B2
(45) Date of Patent: Oct. 30, 2007

(54) DRAWER COMBINATION OF DRAWER CABINET AND DRAWER AS WELL AS AIRCRAFT OR TRAIN PROVIDED WITH SUCH A COMBINATION

(75) Inventors: Laurentius Petrus Joseph Van Loon, Slootdorp (NL); Cornelis Petrus Maria Portegies, Midwoud (NL)

(73) Assignee: Driessen Aircraft Holding B.D., Wieringwerf (NL)

( * ) Notice: Subject to any disclaimer, the term of this patent is extended or adjusted under 35 U.S.C. 154(b) by 79 days.

(21) Appl. No.: 10/527,462

(22) PCT Filed: Sep. 24, 2003

(86) PCT No.: PCT/NL03/00655

§ 371 (c)(1),
(2), (4) Date: Mar. 11, 2005

(87) PCT Pub. No.: WO2004/028301

PCT Pub. Date: Apr. 8, 2004

(65) Prior Publication Data

US 2006/0061243 A1    Mar. 23, 2006

(30) Foreign Application Priority Data

Sep. 24, 2002 (NL) .................................. 1021522

(51) Int. Cl.
*A47B 88/00* (2006.01)

(52) U.S. Cl. ................................ 312/330.1; 312/249.11
(58) Field of Classification Search .............. 312/330.1, 312/249.8, 350, 348.1, 348.2, 334.1, 334.7, 312/334.8, 249.11, 236
See application file for complete search history.

(56) References Cited

U.S. PATENT DOCUMENTS

| 2,514,936 | A | * | 7/1950 | Cook ........................ 126/41 D |
| 3,160,448 | A | * | 12/1964 | Abernathy et al. ........... 384/23 |
| 3,232,687 | A | * | 2/1966 | Mulreed ................... 312/334.8 |
| 3,606,506 | A | | 9/1971 | Ungaro |
| 3,726,579 | A | * | 4/1973 | Ullman, Jr. ............... 312/348.1 |
| 3,744,869 | A | * | 7/1973 | Anderson et al. ......... 312/348.1 |
| 4,129,347 | A | | 12/1978 | Godtschalck |
| 4,911,509 | A | * | 3/1990 | Rock et al. .............. 312/348.1 |
| 5,197,791 | A | * | 3/1993 | Domenig ................. 312/348.1 |
| 5,211,461 | A | * | 5/1993 | Teufel et al. ............. 312/334.4 |
| 5,549,377 | A | * | 8/1996 | Krivec ..................... 312/334.8 |

* cited by examiner

Primary Examiner—Janet M. Wilkens
(74) Attorney, Agent, or Firm—Sughrue Mion Pllc.

(57) ABSTRACT

The invention relates to a drawer comprising a bottom surface (11), two opposing side walls (12,13) and a top surface (14). The side walls are each provided at the top with a recess (15) that extends over the entire side wall, is open towards the outside of the drawer and is delimited from above by a support body (16). Viewed in the vertical direction, the recesses are a recess distance (x) away from the top surface. Viewed in the horizontal direction, the outsides of the support bodies have an external support body spacing (v). The sidewalls are each provided with a supporting foot (17) that extends along the entire sidewall. Viewed in the vertical direction, the supporting foot extends to a supporting foot depth (y) below the bottom surface. Viewed horizontally, the insides of the supporting feet have an internal supporting foot spacing (w). The internal supporting foot spacing (w) is greater than the external support body spacing (v) and the supporting foot depth (y) is greater than the recess distance (x). The invention furthermore relates to a combination comprising at least one drawer according to the invention as well as a drawer cabinet. Furthermore, the invention relates to an aircraft provided with a combination according to the invention.

16 Claims, 3 Drawing Sheets

DRAWER COMBINATION OF DRAWER CABINET AND DRAWER AS WELL AS AIRCRAFT OR TRAIN PROVIDED WITH SUCH A COMBINATION

BACKGROUND OF THE INVENTION

1. Field of the Invention

The present invention relates to a drawer comprising a bottom surface, two opposing side walls parallel to one another and a horizontal top surface defining the top of the drawer, wherein said side walls are each provided at the top with an uppermost recess that extends over the entire side wall, is open towards the outside of the drawer and is delimited from above by an uppermost support body, wherein the uppermost recesses, viewed in the vertical direction, are a recess distance X away from the top surface and wherein the outsides of the uppermost support bodies, viewed in the horizontal direction, have an external support body spacing V.

2. Background

A drawer of this type is known, inter alia, as a drawer from an aircraft trolley of the KSSU type or of the ATLAS type.

In commercial aviation it is customary to provide the passengers with snacks, meals, etc. during the flight. These are wheeled through the cabin past the passengers in turn by means of so-called trolleys. In practice, trolleys of two different types are used; those of the KSSU type and those of the ATLAS type. These are defined trolleys produced in accordance with strict specifications that have been agreed with airlines. Trolleys of the KSSU type as well as trolleys of the ATLAS type are thus both standardised products. Both types of trolleys are provided along facing internal side walls with rail systems with horizontal rails parallel to one another. The rails are separated by a certain spacing in the vertical direction. In the case of trolleys of the KSSU type the spacing is a standard 30 mm and in the case of trolleys of the ATLAS type the spacing is a standard 60 mm. It will be clear that as a result of the smaller spacing, the KSSU trolleys can be provided with more drawers than the ATLAS trolleys for, apart from that, the same height of the trolleys. In the case of trolleys of the KSSU type, it is, moreover, possible as a result of the shorter spacing to achieve a higher degree of loading when using drawers that are shallow in the vertical direction than with an ATLAS trolley. If a shallow drawer, also termed a tray, with a height of approximately 5 mm is slid into an ATLAS trolley, approximately 55 mm of empty space, or at least space not occupied by a drawer, then remains above said tray in the trolley. In the case of a trolley of the KSSU type this distance will be approximately 25 mm.

In the case of trolleys of the KSSU type the drawers are provided at the sides, close to the bottom, with a supporting lip that makes bearing contact with a rail. In order to provide an anti-tip safety feature, the KSSU drawers are provided along a top edge with a similar lip, which, however, will not make contact with a rail, except as soon as tipping occurs. Furthermore, with the KSSU system trays are also provided which are a sort of shallow trays with a bearing edge along the top edge for bearing on a rail.

In the ATLAS system trays are provided that bear along the side edges of their base on rails in the drawer cabinet.

Furthermore, with the ATLAS system drawers are provided which have a standard height of approximately 115 mm. The drawers of the ATLAS system are each provided along their side walls with a recess into which the rails of the drawer cabinet can extend, such that the top of the recess bears on the rails and the drawer is thus completely supported by the top of said recess bearing on the rails.

The ATLAS system is the system that is most widely used. Overall, the KSSU system is used for approximately 10% of aircraft trolleys, whilst the ATLAS system is used for 80 to 90% of aircraft trolleys.

The aim of the present invention is to provide a drawer with which the flexibility of known drawer cabinets for aircraft trolleys can be appreciably increased with regard to drawers of varying height to be used therein, and in particular, but not exclusively, for drawer cabinets of the ATLAS system. However, it will be clear to those skilled in the art that it will also be possible to employ the same principle with drawer cabinets of the KSSU type.

SUMMARY OF THE INVENTION

According to the invention the abovementioned aim is achieved in that the side walls of the drawers are each provided with a supporting foot which extends along the entire side wall and, viewed in the vertical direction, extends below the bottom surface to a supporting foot depth Y, in that the insides of the supporting feet, viewed in the horizontal direction, have an internal supporting foot spacing W and in that the internal supporting foot spacing W is greater than the external support body spacing V and the supporting foot depth Y is greater than the recess distance X.

A drawer according to the invention can be placed in a drawer cabinet in various ways. The drawer can rest with the supporting feet bearing on a pair of rails, but the drawer can also bear on a pair of rails with the uppermost support bodies and as a consequence of the specific sizing it is even possible that one and the same pair of rails on the one hand supports a drawer that is, as it were, suspended below it and, on the other hand, supports a drawer on top of it and bearing thereon with the supporting feet, and specifically does so at one and the same time. With reference to the ATLAS system, where the vertical spacing between adjacent rails is 60 mm, the consequence of this is that the 60 mm space between two pairs of rails located one above the other can be filled with two drawers (instead of with only one drawer as known from the state of the art), which two drawers then each have a height of at most approximately 30 mm. It will be clear to those skilled in the art that this can also be achieved with the KSSU system, where, as a consequence of the much smaller vertical spacing between adjacent rails, the effect will provide relatively less additional loading capacity, or at least usually less useful additional loading capacity, because in this case the result of the various features will be that—maintaining the earlier comparison—a maximum height of the two drawers to be accommodated between pairs of rails located one above the other will be approximately 15 mm and the drawers will thus be fairly shallow.

According to a preferred embodiment, the vertical distance H between the top of the uppermost recess and the bottom of the supporting foot is:

$$H = d \times S$$

where:

d=an integer greater than zero

S=spacing

H=vertical distance between the top of the uppermost recess and the bottom of the supporting foot.

To increase the flexibility in loading with diverse types of drawers as well as to maximise the loading capacity of the drawer cabinet, in this context it is highly advantageous according to the invention if each side wall is provided with d-1 intermediate recesses running parallel to the uppermost recess and if adjacent intermediate recesses as well as the highest intermediate recess and the uppermost recess, viewed in the vertical direction, are always separated by a recess spacing equal to the spacing S. In this way it becomes possible to place a drawer in the drawer cabinet not only resting on top of a pair of rails or suspended beneath a pair of rails, but also in one or more intermediate positions, as it were, between two pairs of rails opposite one another.

In this context it is particularly preferential if the intermediate recesses are delimited at the top by an intermediate support body.

From the structural engineering standpoint it is highly advantageous according to the invention if the base as well as the side walls with, in each case, the uppermost recess, any intermediate recesses, the support bodies and the supporting foot are formed from a single sheet section. Such a sheet section can be worked relatively easily by means of operations obvious to those skilled in the art, such as setting and folding operations or pressing operations, in such a way that a base remains that has a transition via supporting feet into the side walls and where the side walls are then provided with the various recesses.

In order to be able to cool a trolley, for example to be able to offer chilled drinks to the passengers, according to the invention it is highly advantageous in the case of drawers with, in particular, d=1, if the drawer is filled with cooling agent, such as, in particular, dry ice. Dry ice is understood to be frozen $CO_2$, which on evaporation extracts cold from the surroundings.

According to a further aspect, the invention relates to a combination comprising, on the one hand, one or more drawers according to the invention,—which drawers, as will be clear, do not have to be identical to one another—and, on the other hand, a drawer cabinet, wherein the drawer cabinet is provided on two opposing sides facing one another with a rail system with horizontal rails, wherein the rails are separated by a rail spacing in the vertical direction such that the one or more drawers according to the invention—which may or may not be identical to one another—are able, when these have been pushed into the cabinet, to bear on said rails with their uppermost support bodies and/or intermediate support bodies and/or supporting feet, depending on how this works out with a view to effective loading of the drawer cabinet. With the combination according to the invention it is, in particular, advantageous if this combination comprises at least one drawer in accordance with at least Claim 2, wherein the rail spacing is 2×S, where S is the spacing.

In the case of the combination according to the invention it is furthermore highly advantageous if the drawer cabinet is an aircraft trolley or train trolley on wheels, in particular a catering trolley.

According to yet a further particular embodiment of the combination according to the invention, the drawer cabinet is a trolley of the ATLAS type.

According to yet a further aspect, the present invention relates to an aircraft provided with a combination according to the invention as well as to a train provided with a combination according to the invention.

BRIEF DESCRIPTION OF THE DRAWINGS

The present invention will be explained in more detail below with reference to an illustrative embodiment shown diagrammatically in the drawing. In the drawing.

DETAILED DESCRIPTION OF THE PREFERRED EMBODIMENTS

Figure 1:
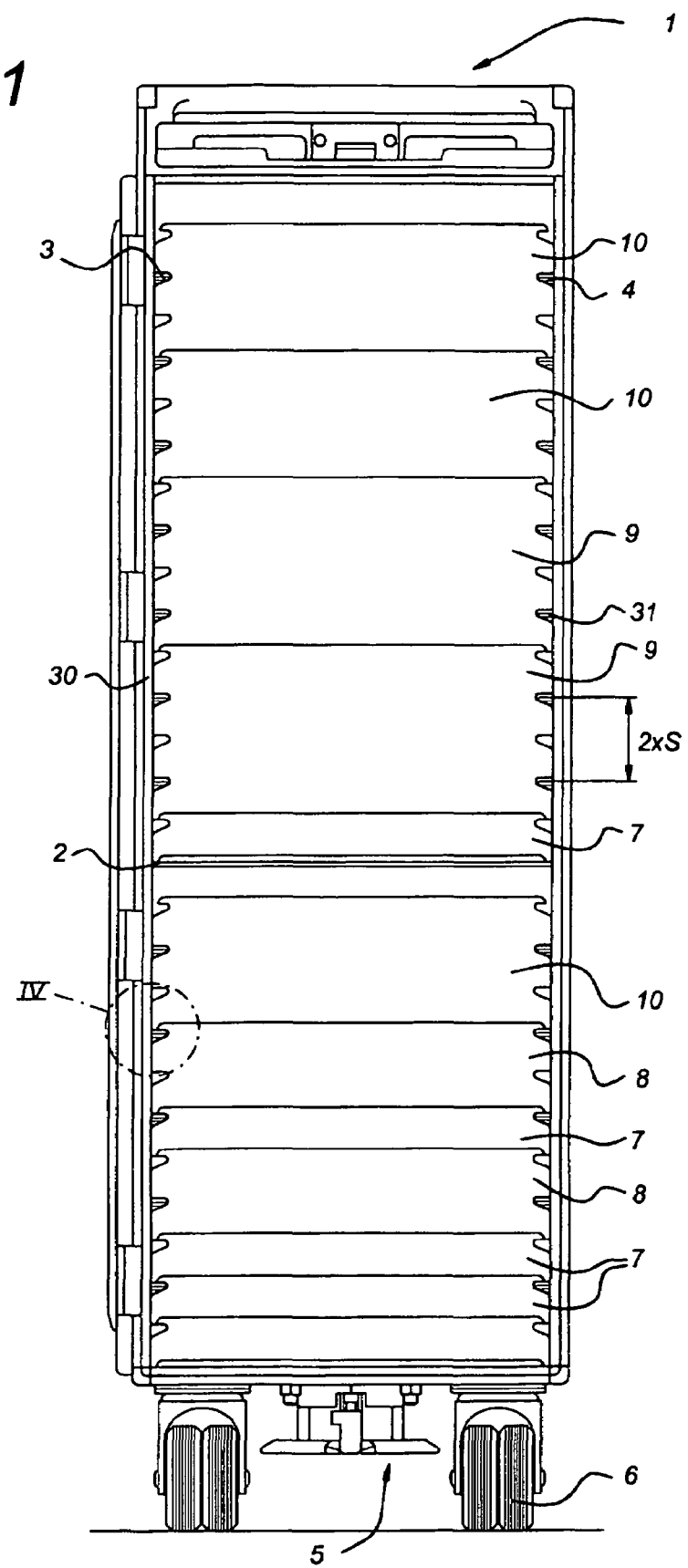
FIG. 1 shows a diagrammatic view of a trolley of the ATLAS type with a number of drawers according to the invention therein, and thus showing a combination according to the invention.

FIG. 1 shows a so-called ATLAS trolley 1, which, as is customary, is mobile on wheels 6 and by means of a foot-operated brake system 5 can be parked with the brake on and also can be released from the brake. As arises frequently per se, the trolley 1 is provided in the middle with a partition 2 that joins the trolley walls 30 and 31 to one another. The trolley walls 30 and 31 are also provided on the insides facing one another with rails 3 and 4, respectively, which in each case are positioned one above the other a distance apart with a spacing of 2×S. A number of drawers according to the invention have been inserted in the trolley 1. In the example shown, these are five drawers 7 each with a height S, two drawers 8 each with a height 2S, three drawers 10 each with a height 3S and two drawers 9 each with a height 4S. As will be apparent below, the height of each drawer is not precisely a multiple of S but in each case a multiple of S+X, where X is the so-called recess distance that is still to be discussed below.

In the example, the drawer 7 located immediately above the partition 2 is a drawer filled with cooling agents, the cooling agents consisting of so-called dry ice. However, as can be seen from FIG. 1 it should be clear that several drawers 7 provided with cooling agent can be provided; in essence, these can be provided in any desired location.

Figure 2:
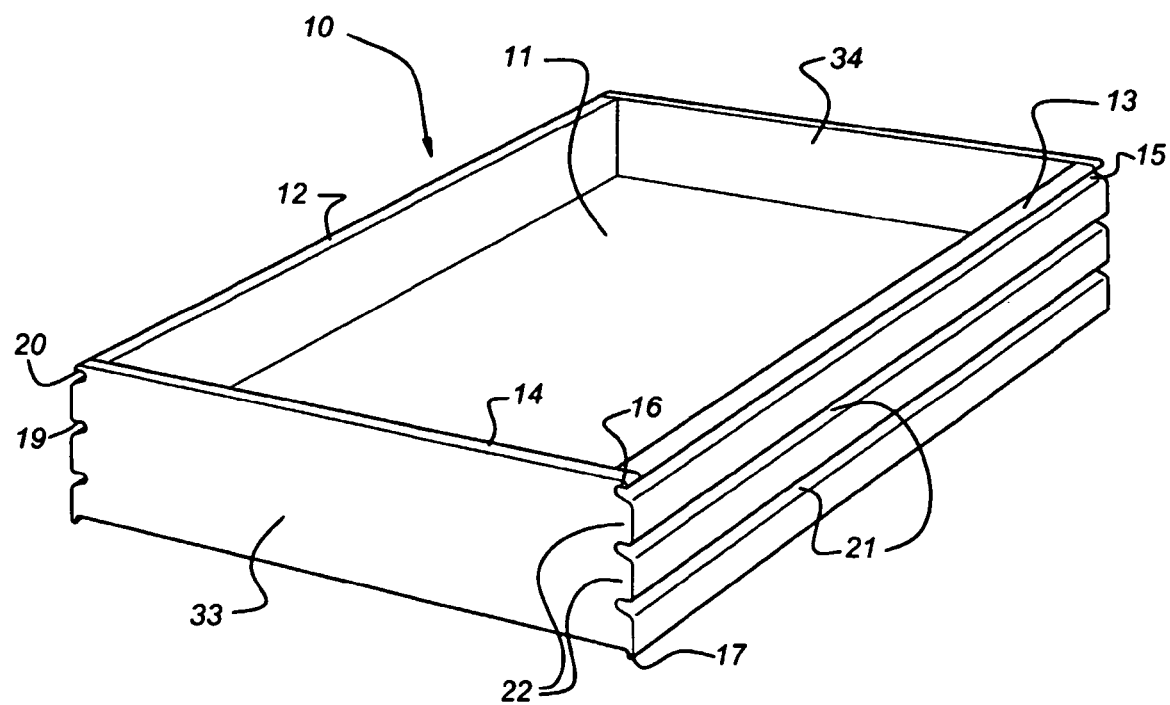
FIG. 2 shows a diagrammatic, perspective view of a drawer according to the invention.

With reference to, in particular, FIG. 2, each drawer 7, 8, 9, 10 according to the invention comprises a bottom surface 11, two opposing side walls 12, 13 parallel to one another, and a horizontal top surface 14, defining the top of the drawer, which, as shown in FIG. 2, will usually be open.

Figure 3:
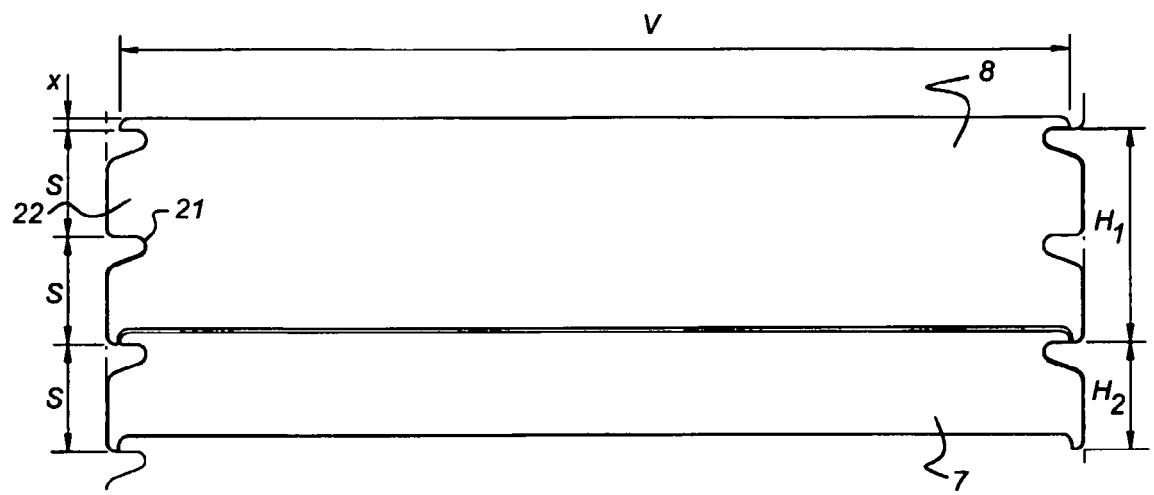
FIG. 3 shows, for further visualisation of aspects of the invention, a view of two drawers according to the invention placed one above the other.

With reference to FIGS. 2 and 3, the side walls 12, 13 are each provided at the top with an uppermost recess 15 that extends over the entire side wall and is open towards the outside of the drawer, and the uppermost recess 15 is delimited from above by an uppermost support line 16. Viewed in the vertical direction, that is to say in the height direction of the trolley 1, the uppermost recesses 15 are a distance X, termed the recess distance, away from the top surface 14. Viewed in the horizontal direction, the outsides of the uppermost support bodies 16 have an external support body spacing V.

Figure 4:
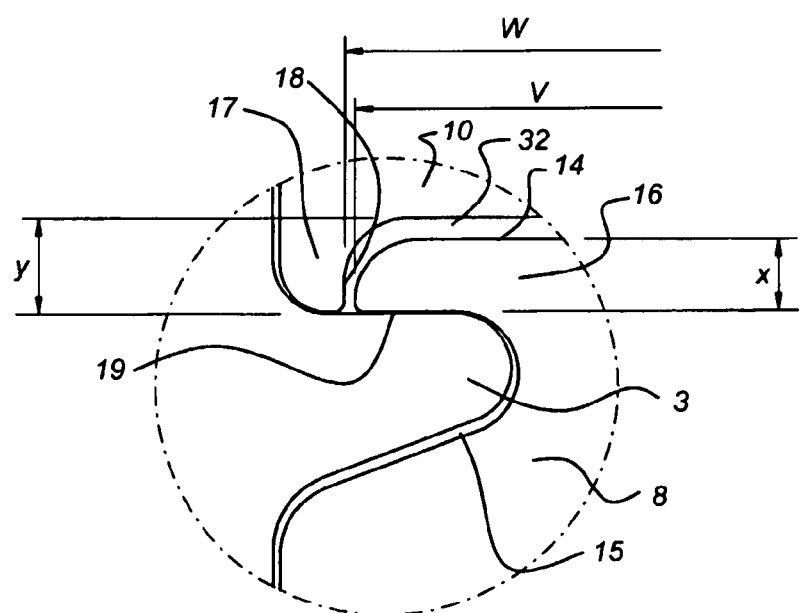
FIG. 4 shows the detail IV from FIG. 1, likewise for further visualisation of aspects of the invention.

In accordance with, in particular, the invention, the side walls 12, 13 are now each provided with a supporting foot 17 extending along the entire side wall, that is to say in the depth direction of the trolley 1 or perpendicularly to the plane of the drawing according to FIG. 1, the bottom 20 of which supporting foot 17, viewed in the vertical direction, is a distance Y, termed the supporting foot depth, below the bottom surface 11 of the drawer. The insides 18 of the supporting feet 17 have an internal supporting foot spacing W, viewed in the horizontal direction. By now, in accordance with the invention, on the one hand, taking the internal supporting foot spacing W to be greater than the external support body spacing V and, on the other hand, taking the supporting foot depth Y to be greater than the recess distance X, it becomes possible for two drawers located one above the other to be guided on one and the same rail 3, 4, as is illustrated in FIGS. 1, 3 and in particular the detail according to FIG. 4. After all, the supporting feet 17 are able to extend completely round the support body 16 so as to engage on the same rail 3, 4, leaving a clearance 32 between the drawers located one above the other. It should be clear that the clearance 32 can be large should this be desired, but in particular will be small such that the drawers located one above the other are just not in contact with one another.

To increase the flexibility, that is to say positional freedom, with which the drawers according to the invention can be placed in the ATLAS trolley or other type of drawer cabinet, it is particularly advantageous according to the invention if, in particular in the case of higher drawers, the side walls 12, 13 are provided with additional intermediate recesses 21 located between the uppermost recess 15 and support bodies 17. These intermediate recesses 21 will, in particular, be shaped essentially identically to the uppermost recess 15, on the understanding that the intermediate recesses 21, viewed in the horizontal direction, can be deeper than the uppermost recesses 15. After all, these uppermost recesses 15 must allow a supporting foot of a drawer located above them to drop over the uppermost support body 16. As is illustrated in FIG. 3, the spacing between adjacent intermediate recesses 21, viewed in the vertical direction, will be S. It will be clear that in order to be able to create a support at the intermediate recesses 21, these intermediate recesses 21 will be delimited at the top by a so-called intermediate body 22.

As is illustrated in more detail in FIG. 1 by means of a number of different drawers, it thus becomes possible to, for example, guide a drawer 8 (the first drawer 8 from the bottom) on two rails 3, 4 that protrude into the intermediate recess 21, to, for example, guide a drawer 10 on two rails 3, 4 that protrude into an uppermost intermediate recess 21, as well as on two rails 3, 4, on which the supporting feet 17 bear, and also to guide a drawer 10 on two rails 3, 4 that protrude into the lowest intermediate recess 21 and two rails 3, 4 that protrude into the uppermost recess 15, etc.

With reference to, in particular, FIG. 2, it will be clear that the drawers 7, 8, 9 and 10 can be formed from a one-piece sheet section supplemented by suitably shaped end faces 33 and 34. By working the sheet section in a suitable manner—those skilled in the art will be able to put forward various techniques for this purpose—it is possible to form the base 11 with side walls 12, 13, as well as the support bodies 17, uppermost recesses 15 and any intermediate recesses 21 formed therein or thereon, respectively, from said sheet section. The end faces 33 and 34 can then simply be inserted in the ends of the essentially U-shaped semi-finished product and fixed to the sheet section by means of various techniques, such as screws or pop rivets.

The invention claimed is:
1. Drawer (7, 8, 9, 10) comprising:
a bottom surface (11), two opposing side walls (12, 13) parallel to one another and a horizontal top surface (14) defining the top of the drawer,
wherein said side walls (12, 13) are each provided at the top with an uppermost recess (15) that extends along the entire side wall and is, in a horizontal direction, open towards the outside of the drawer,
wherein each said uppermost recess is delimited from above by an uppermost support body (16) which includes said horizontal top surface (14),
wherein each said uppermost recess, as viewed in the vertical direction, is a recess distance X away from the top surface (14) and wherein a spacing between the outside of the uppermost support body of one of the side walls and the outside of the uppermost support body of the other of the side walls, as viewed in the horizontal direction, corresponds to an external support body spacing V,
wherein the side walls (12, 13) are each provided with a supporting foot (17) which extends along the entire side wall and, viewed in the vertical direction, extends below the bottom surface (11) to a supporting foot depth Y,
wherein a spacing between the inside (18) of the support foot of one of the sidewalls and the inside of the support foot of the other of said sidewalls, as viewed in the horizontal direction, corresponds to an internal supporting foot spacing W,
wherein the internal supporting foot spacing W is greater than the external support body spacing V such that when another said drawer is stacked on top of said drawer to provide an upper drawer and a lower drawer, the supporting feet (17) of said upper drawer can accommodate the uppermost support bodies of said lower drawer, viewed in the horizontal direction, in between the supporting feet of said upper drawer, and
wherein the supporting foot depth Y is greater than the recess distance X.

2. Drawer according to claim 1, wherein the vertical distance H between the top (19) of the uppermost recess (15) and the bottom (20) of the supporting foot (17) is:

$H = d \times S$ where:
d=an integer greater than zero
S=spacing
H=vertical distance between the top (19) of the uppermost recess (15) and the bottom (20) of the supporting foot (17).

3. Drawer according to claim 2, wherein d>1, wherein each side wall (12, 13) is provided with d−1 intermediate recesses (21) running parallel to the uppermost recess and wherein adjacent intermediate recesses (21) as well as the highest intermediate recess (21) and the uppermost recess (15), viewed in the vertical direction, are always separated by a recess spacing equal to the spacing (S).

4. Drawer according to claim 3, wherein the intermediate recesses are delimited at the top by an intermediate support body (22).

5. Drawer according to claim 4, wherein the bottom surface as well as the side walls with, in each case, the uppermost recess, any intermediate recesses, the support body and the supporting foot are formed from a single sheet section.

6. Drawer according to claim 4, wherein d<5.

7. Drawer according to claim 3, wherein d<5.

8. Drawer according to claim 2, wherein d<5.

9. Combination comprising, on the one hand, one or more drawers according to claim 1 and, on the other hand, a drawer cabinet, wherein the drawer cabinet is provided on two opposing sides facing one another with a rail system with horizontal rails, wherein the rails are separated by a rail spacing in the vertical direction such that the one or more drawers according to claim 1, are able, when these have been pushed into the cabinet, to bear on said rails with their uppermost support bodies and/or intermediate support bodies and/or supporting feet.

10. Combination according to claim 9, comprising at least one drawer wherein the vertical distance H between the top (19) of the uppermost recess (15) and the bottom (20) of the supporting foot (17) is:

$$H = d \times S$$

where:
d=an integer greater than zero
S=spacing
H=vertical distance between the top (19) of the uppermost recess (15) and the bottom (20) of the supporting foot (17), wherein the rail spacing is 2×S, where S is the spacing.

11. Combination according to claim 10, wherein the drawer cabinet is an aircraft trolley on wheels.

12. Combination according to claim 9, wherein the drawer cabinet is an aircraft trolley on wheels.

13. Combination according to claim 12, wherein the drawer cabinet is a trolley of the ATLAS type.

14. Aircraft provided with a combination according to claim 9.

15. Train provided with a combination according to claim 9.

16. Drawer (7, 8, 9, 10) comprising:
a bottom surface (11), two opposing side walls (12, 13) parallel to one another and a horizontal top surface (14) defining the top of the drawer,
wherein said side walls (12, 13) are each provided at the top with an uppermost recess (15) that extends over the entire side wall, is open towards the outside of the drawer and is delimited from above by an uppermost support body (16), wherein the uppermost recesses, viewed in the vertical direction, are a recess distance X away from the top surface (14) and wherein the outsides of the uppermost support bodies (16), viewed in the horizontal direction, have an external support body spacing V,
wherein the side walls (12, 13) are each provided with a supporting foot (17) which extends along the entire side wall and, viewed in the vertical direction, extends below the bottom surface (11) to a supporting foot depth Y, in that the insides (18) of the supporting feet (17), viewed in the horizontal direction, have an internal supporting foot spacing W and in that the internal supporting foot spacing W is greater than the external support body spacing V and the supporting foot depth Y is greater than the recess distance X;
wherein the vertical distance H between the top (19) of the uppermost recess (15) and the bottom (20) of the supporting foot (17) is:

$$H = d \times S$$

where:
d=an integer greater than zero
S=spacing
H=vertical distance between the top (19) of the uppermost recess (15) and the bottom (20) of the supporting foot (17); and
wherein d>1, wherein each side wall (12, 13) is provided with d−1 intermediate recesses (21) running parallel to the uppermost recess and wherein adjacent intermediate recesses (21) as well as the highest intermediate recess (21) and the uppermost recess (15), viewed in the vertical direction, are always separated by a recess spacing equal to the spacing (S).

* * * * *